United States Patent [19]

Isozumi

[11] Patent Number: 4,929,857

[45] Date of Patent: May 29, 1990

[54] ELECTRIC STARTER WITH BIASED FULCRUM

[75] Inventor: Shuzoo Isozumi, Hyogo, Japan

[73] Assignee: Mitsubishi Denki Kabushiki Kaisha, Tokyo, Japan

[21] Appl. No.: 344,793

[22] Filed: Apr. 28, 1989

[30] Foreign Application Priority Data

Jun. 22, 1988 [JP] Japan ................................ 63-155842

[51] Int. Cl.[5] ......................... H02K 7/118; H01H 9/02

[52] U.S. Cl. ........................................ 310/83; 74/7 A; 384/2; 403/145

[58] Field of Search .......................... 74/7 A; 267/173; 310/83, 80; 384/2; 403/145; 335/131; 290/48

[56] References Cited

U.S. PATENT DOCUMENTS

| | | | |
|---|---|---|---|
| 1,918,394 | 7/1933 | Hufferd et al. | 403/145 |
| 2,635,904 | 4/1953 | Roby | 403/145 |
| 2,807,486 | 9/1957 | Bixby | 403/145 |
| 4,520,285 | 5/1985 | Isozumi et al. | 310/83 |
| 4,637,267 | 1/1987 | Mazzorana | 74/7 A |
| 4,677,407 | 6/1987 | Tanaka et al. | 335/202 |
| 4,755,781 | 7/1988 | Bogner | 335/131 |

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

An electric starter comprising a dc motor; an output rotary shaft which is rotated by an armature shaft; an overrunning clutch fitted on the output rotary shaft so that the clutch is slidable in the axial direction thereof; a splined tube coupled to outer member of the clutch and engaged with the helical splines of the output rotary shaft so as to transmit the torque of the shaft to the outer member. A shift lever is engaged at the lower end thereof with the peripheral portion of the tube and at the upper end with the actuator of an electromagnetic switch provided at the peripheral portion of the dc motor, so that the lever is swingable about the fulcrum thereof, wherein the fulcrum is shaped as a cylindrical body, the bottom of the inside of which is shaped as an arc. A holder having a surface curved to correspond to the arc-shaped bottom of the inside of the fulcrum is provided therein so that the curved surface is in contact with the bottom; and a spring is provided on the holder so that the fulcrum is pushed toward the support projection of a front bracket.

4 Claims, 3 Drawing Sheets

ELECTRIC STARTER WITH BIASED FULCRUM

BACKGROUND OF THE INVENTION

The present invention relates to an electric starter for starting an internal combustion engine, and particularly relates to an improved actuator for an electromagnetic switch, which moves the overrunning clutch of an electric starter.

FIG. 4 shows a longitudinally sectional view of a conventional electric starter 1 comprising a dc motor 2, a front bracket 3, an output rotary shaft 4, an overrunning clutch 5, helical splines 6, a splined tube 7, a pinion 8, a shift lever 9, and an electromagnetic switch 10. The output rotary shaft 4 is supported by a bearing **3*a* fitted in the front bracket 3 and is integrally conjoined to the front end of the armature shaft 2*a* of the dc motor 2. The overrunning clutch 5 is fitted on the output rotary shaft 4 so that the clutch is slidable in the axial direction thereof. The helical splines 6 are formed on the output rotary shaft 4. The splined tube 7 is integrally conjoined to the outer member 5*a* of the clutch 5 and engaged with the helical splines 6 to transmit the torque of the output rotary shaft 4 to the outer member of the clutch. The pinion 8 is integrally formed on the inner member 5*b* of the clutch 5. The shift lever 9 is engaged at the lower end thereof with the splined tube 7 and at the upper end thereof with a pin 12 attached to the actuator 11 of the electromagnetic switch 10 provided at the peripheral portion of the dc motor 2. The shift lever 9 is swingable about the fulcrum portion 13 thereof. A spring 14 is provided in the actuator 11 to push the pinion 8** onto the ring gear of an engine (which is not shown in the drawing) when the pinion is engaged with the ring gear.

When the electric starter is put into action, the electromagnetic switch 10 is electrically energized so that the actuator 11 is magnetically attracted to swing the shift lever 9 about the fulcrum portion 13 to move the upper end of the lever backward (leftward as to FIG. 4), and the lower end thereof forward (rightward as to FIG. 4). As a result, the overrunning clutch 5 is moved forward on the output rotary shaft 4 and the pinion 8 is engaged with the ring gear of the engine to start it.

However, since the actuator 11 of the electromagnetic switch 10 has an internal opening in which the spring 14 is provided, the effective cross-sectional area of the magnetism passage of the actuator is so small that the magnetic attractive force of the switch is not high enough to properly swing the shift lever 9. This is a problem.

SUMMARY OF THE INVENTION

The present invention was made in order to solve the above mentioned problem.

Accordingly, it is an object of the present invention to provide an electric starter in which a spring is not provided in the actuator of an electromagnetic switch and the effective cross-sectional area of the actuator is therefore large enough to apply a high magnetic attractive force to the actuator to properly swing a shift lever. The electric starter comprises a dc motor; an output rotary shaft which is rotated by an armature shaft of the dc motor; an overrunning clutch fitted on the output rotary shaft so that the clutch is slidable in the axial direction thereof; a splined tube coupled to the outer member of the clutch and engaged with the helical splines of the output rotary shaft to transmit the torque of the shaft to the outer member of the clutch; and the shift lever engaged at the lower end thereof with the peripheral portion of the splined tube and at the upper end thereof with the actuator of the electromagnetic switch provided at the peripheral portion of a dc motor, so that the shift lever is swingable about the fulcrum portion thereof. The electric starter is characterized in that the fulcrum portion of the shift lever is shaped as a cylindrical body, the bottom of the inside of which is shaped as an arc; a holder having a surface curved to correspond to the arc-shaped bottom of the inside of the fulcrum portion is provided therein so that the curved surface is in contact with the arc-shaped bottom; and a spring is provided on the holder so that the fulcrum portion is pushed toward the support projection of a front cover.

Since the actuator does not have an internal opening for housing the spring, the effective cross-sectional area of the actuator is large enough to apply the high magnetic attractive force to the actuator. The spring is provided at the fulcrum portion of the shift lever to push the portion toward the support projection of the front bracket. As a result, the shift lever is properly swung about the fulcrum portion thereof.

DETAILED DESCRIPTION OF EXEMPLARY EMBODIMENTS

Embodiments of the present invention ar hereafter described in detail with reference to the drawings attached hereto.

Figure 1:
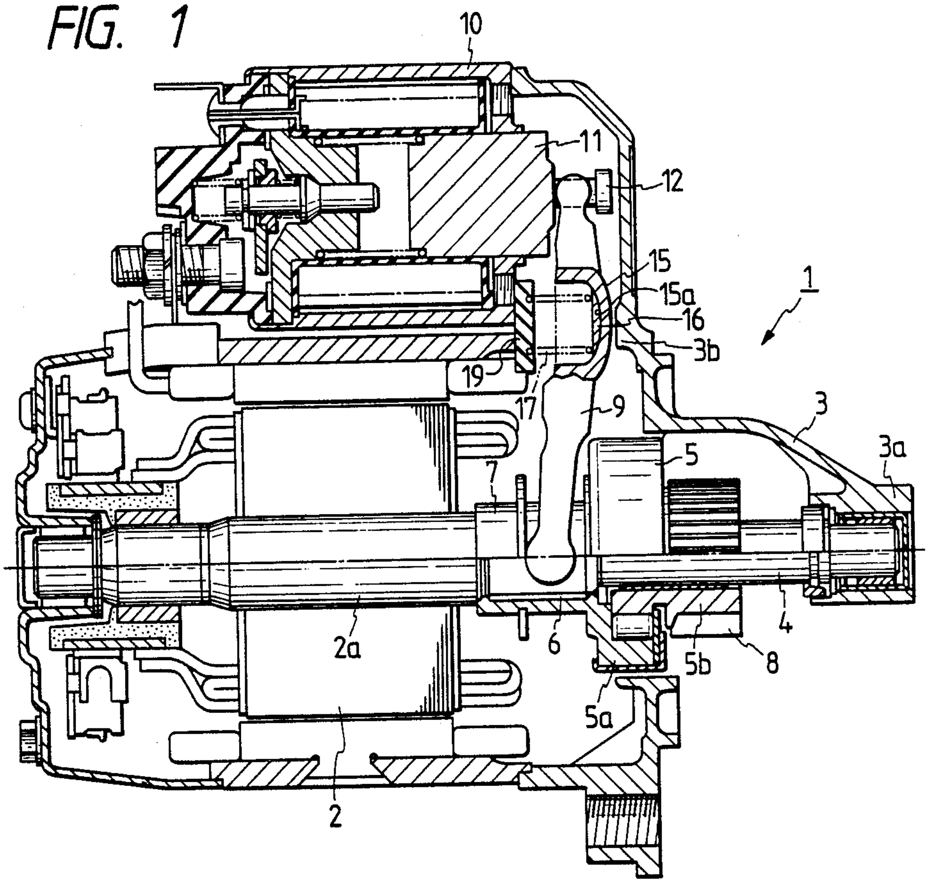
FIG. 1 shows a longitudinally sectional view of an electric starter which is an embodiment of the present invention.
Figure 2:
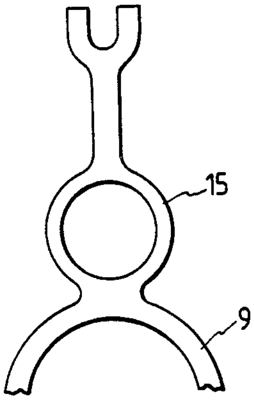
FIG. 2 shows a partial rear view of the shift lever of the starter.

FIG. 1 shows a longitudinally sectional view of an electric starter which is one of the embodiments. The fulcrum portion 15 of the shift lever 9 of the starter is shaped as a hollow bottomed cylinder as shown in FIGS. 1 and 2. The bottom **15*a* of the inside of the fulcrum portion 15 is shaped as an arc. A holder 16, whose rear is a flat surface and whose front is a surface curved to correspond to the arc-shaped bottom 15*a* of the inside of the fulcrum portion 15, is provided in the fulcrum portion so that the curved front of the holder is in contact with the arc-shaped bottom. A spring 17 is provided between the holder 16 and a seal 19 so that the front of the fulcrum portion 15 is pushed onto the support projection 3*b* of a front bracket 3**.

When the electromagnetic switch 10 of the starter is electrically energized, the actuator 11 of the switch is magnetically attracted so that the shift lever 9 is swung about the fulcrum portion 15 thereof to move the upper end of the lever backward (leftward as to FIG. 1) and the lower end thereof forward (rightward as to FIG. 1). As a result, an overrunning clutch 5 is moved forward on an output rotary shaft 4 so that a pinion 8 is engaged with the ring gear of an engine to transmit the torque of the electric motor of the starter to start the engine. At the time of the swinging of the shift lever 9, the cylindrically-shaped fulcrum portion 15 thereof tilts on the support projection 3b of the front bracket 3 (but the holder 16 and the spring 17) do not tilt. Since the fulcrum portion 15 receives a bending moment, it is preferable to embed a metal piece in the fulcrum portion at the time of molding thereof so as to reinforce the fulcrum portion.

Since the actuator 11 of the electromagnetic switch 10 does not have an internal opening for housing a spring, the effective cross-sectional area of the actuator is large enough to apply a high magnetic attractive force thereto to properly swing the shift lever 9.

Figure 4:
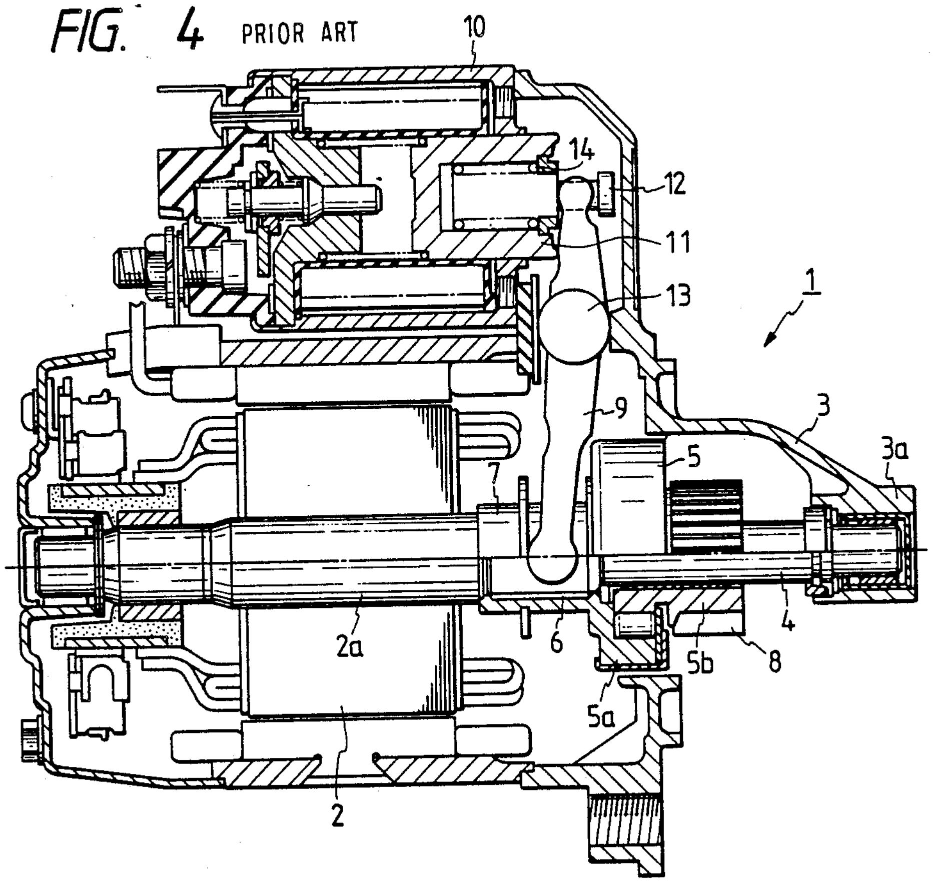
FIG. 4 PRIOR ART
FIG. 4 shows a longitudinally sectional view of a conventional electric starter.

The other constitution and operation of the electric starter are the same as those of the conventional electric starter shown in FIG. 4. The mutually corresponding portions of the starters are denoted by the same reference symbols in the drawings.

Figure 3:
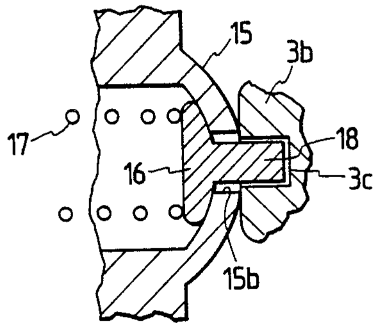
FIG. 3 shows a longitudinally-sectional view of th fulcrum portion of the shift lever of an electric starter which is another embodiment of the present invention.

FIG. 3 shows a longitudinally-sectional partial view of an electric starter which is the other one of the embodiments. The difference of the starter from that shown in FIGS. 1 and 2 is that a holder 16 has a projecting portion 18 inserted into the recess 3c of the support projection 3a of a front bracket through the hole 15b of the fulcrum portion 15 of a shift lever. As a result, the holder 16 and a spring 17 are more surely prevented from being displaced, so that the shift lever is more precisely swung about the fulcrum portion thereof.

What is claimed is:

1. An electric starter comprising: a dc motor;

a front bracket integrally conjoined to a front end of an armature shaft of said dc motor;

an output rotary shaft which is rotated by the armature shaft of the dc motor;

an overrunning clutch fitted on said output rotary shaft so that said clutch is slidable in the axial direction thereof;

a splined tube coupled to an outer member of said clutch and engaged with a helical spline integrally formed on said output rotary shaft so as to transmit the torque of said output rotary shaft to said outer member of said clutch;

a shift lever engaged at a lower end thereof with a peripheral portion of said splined tube end at an upper end thereof with an actuator of an electromagnetic switch provided at a peripheral portion of the dc motor, so that said lever is swingable about a fulcrum portion thereof, said fulcrum portion being shaped as a hollow cylindrical body, the bottom of the inside of which is being shaped as an arc;

a holder having a surface curved to correspond to the arc-shaped bottom of the inside of said fulcrum portion, said holder being provided in said fulcrum portion so that said curved surface is in contact with said bottom; and a spring provided on said holder so that said fulcrum portion is pushed toward a support projection of said front bracket.

2. An electric starter according to claim 1 wherein said holder comprises a front surface curved to correspond to the arc-shaped bottom of the inside of the fulcrum portion and a rear surface shaped as flat surface.

3. An electric starter according to claim 1 wherein said spring is provided between said holder and a seal so that said front surface of the fulcrum portion is pushed onto the support projection of said front bracket.

4. An electric starter according to claim 1 wherein said holder has a projection portion inserted into a recess provided on the support projection of said front bracket through a hole provided on said fulcrum portion of said shift lever.

* * * * *